April 24, 1934.   H. A. KNOX ET AL   1,955,751
TRACK FOR TRACKLAYING VEHICLES
Filed June 9, 1933
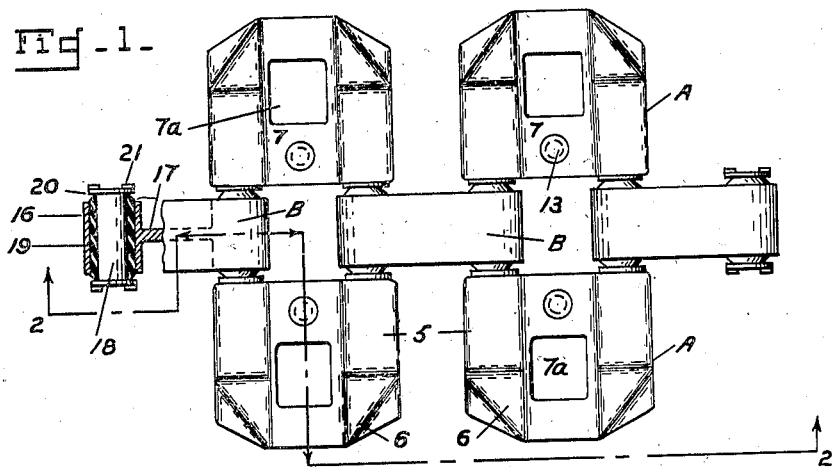
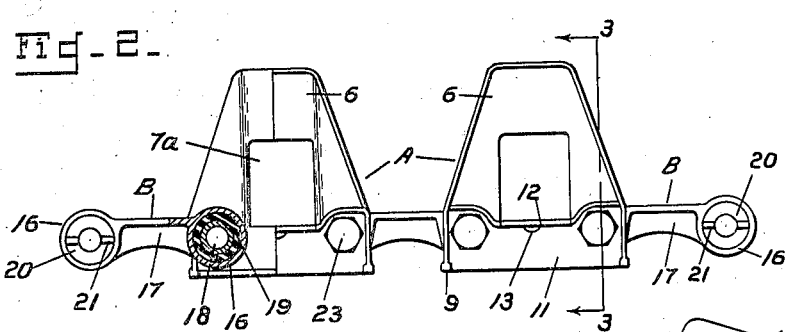
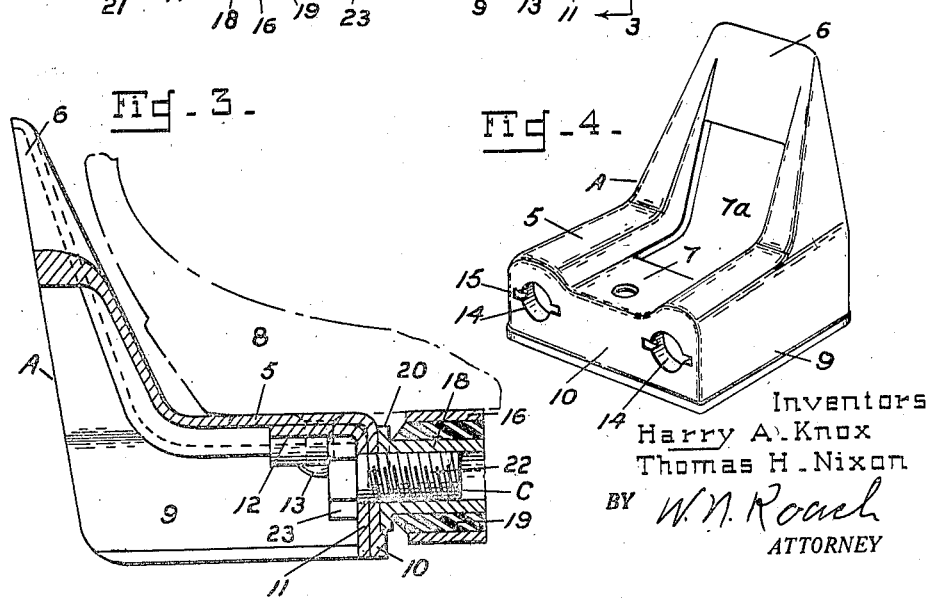
Inventors
Harry A. Knox
Thomas H. Nixon
BY W. N. Roach
ATTORNEY Patented Apr. 24, 1934

1,955,751

UNITED STATES PATENT OFFICE 1,955,751

TRACK FOR TRACKLAYING VEHICLES

Harry A. Knox, Davenport, Iowa, and Thomas Hay Nixon, United States Army, Gettysburg, Pa.

Application June 9, 1933, Serial No. 675,074

13 Claims. (Cl. 305—10)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a track for tracklaying vehicles especially adapted for pneumatic tires.

The purpose of the present invention is to provide a track of light weight in which the shoes are conveniently formed of two similar plates connected to links by link pins.

A further object is to provide a novel link and link pin construction which will be strong, readily assembled, held against turning relative to the plates forming the shoe, and afford lateral flexibility between adjacent shoes.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a plan view of a portion of the lower flight of a track constructed in accordance with the invention.

Fig. 2 is a view partly in side elevation and partly in section.

Fig. 3 is an enlarged sectional view on the line 3—3 of Fig. 2.

Fig. 4 is a perspective view of one of the plates.

The track comprises a series of shoes A connected in spaced relation by links B mounted on link pins C.

The shoes are all identical and each one consists of a pair of similar angled plates (Fig. 4) including a horizontal tread portion 5 and a tapered inclined portion 6 forming a wheel guide.

The portions 5 and 6 are formed with a central channel 7 gradually decreasing in depth towards the extremity of the inclined portion 6. The channel structure provides stiffening for the plate and affords a good tread surface for engaging the pneumatic tire 8. The channel is preferably provided with an aperture 7a to permit mud and dirt to be cleaned from the shoe.

The plate includes end aprons 9—9 and an apron 10 on its inner side also providing stiffening for the plate and constituting cleats for engaging the ground. The inside apron 10 has an increased thickness which is preferably provided by the addition of a reinforcing plate 11 having a flange 12 conforming to and fitting against the channeled portion 5. A single rivet 13 passing through the flange 12 and the channeled portion 5 is sufficient to securely hold the reinforcing plate 11 in position. The inside apron and the reinforcing plate are provided adjacent their ends with a pair of apertures 14—14, and the apron is additionally formed with keyways or recesses 15 about the periphery of its apertures.

The links B are each formed of a flat strip having bearings 16—16 at its opposite ends and having a web 17 on one side between the bearings. Within each bearing is a tube 18 maintained in spaced relation thereto by a sleeve 19, of an elastic or resilient material such as rubber, which is preferably secured by vulcanization to the tube 18 and press fitted in the bearing.

The tube 18 is of greater width than the bearing and terminates in annular flanges 20—20 adapted to bear against the inside aprons 10 to space the angled plates of each shoe and provide lateral stability to the unit when assembled. On each end of the tube are a number of axially projecting lugs 21 adapted to enter the keyways or recesses 15 in the aprons 10 when the unit is assembled and effectively prevent relative rotational movement between the tube and the shoe A.

When the lugs 21 are fitted in the recesses 15, the apertures 14 in the pair of angled plates of each shoe are in alignment with the bore of the tube 18. The link pin C (Fig. 3) is constituted by a pair of bolts 22, each bolt inserted through an aperture 14 in one angled plate and threaded internally in one end of the tube 18. The head 23 of each bolt bears against the corresponding reinforcing plate 11 and clamps it and the apron 10 against the flange 20 of the tube 18.

The links B connect the adjoining link pins C of adjoining shoes A.

Since the tube 18 is held against rotation relative to the shoe A, any flexing action between the link and shoe both in longitudinal and lateral directions must take place through distortion of the rubber sleeve 19.

The assembly and disassembly of the track is accomplished by inserting or removing the bolts 22. The links B carry the spacing tubes 16 and may be readily replaced.

We claim.

1. In a track for track-laying vehicles, a series of spaced shoes, each shoe consisting of a pair of identical angled plates spaced transversely of the track, each plate having a horizontal tread portion and a tapered, inclined, outer guide portion with a channel extending through said portion, each angled plate having end aprons and an inside apron, a reinforcing plate for the inside apron a flange fitting against the channeled tread portion of the angled plate, means for securing said reinforcing plate to the tread portion, links for connecting the ends of each shoe with adjacent shoes, each link having bearings on opposite ends, a rubber sleeve within each bearing, a tube within each sleeve and vulcanized thereto, said tube being longer than the bearing and having annular flanges on its ends adapted to bear against the inside aprons of the spaced angled plates, lugs on the ends of the tube engaging the inside aprons, and headed bolts passing through the inside aprons and reinforcing plates and threaded in the tube, the heads of the bolts bearing against the reinforcing plates.

2. In a track for track-laying vehicles, a series of spaced shoes, each shoe consisting of a pair of identical angled plates spaced transversely of the track, each plate having a horizontal tread portion and a tapered, inclined, outer guide portion with a channel extending through said portions, each angled plate having end aprons and an inside apron, links for connecting the ends of each shoe with adjacent shoes, each link having bearings on opposite ends, a rubber sleeve within each bearing, a tube within each sleeve and vulcanized thereto, said tube being longer than the bearing and having annular flanges on its ends adapted to bear against the inside aprons of the spaced angled plates, lugs on the ends of the tube engaging the inside aprons, and bolts passing through the inside aprons and threaded in the tube.

3. In a track for track-laying vehicles, a series of spaced shoes, each shoe consisting of a pair of identical angled plates spaced transversely of the track, each plate having a horizontal tread portion and a tapered, inclined, outer guide portion, each angled plate having end aprons and an inside apron, links for connecting the ends of each shoe with adjacent shoes, each link having bearings on opposite ends, a rubber sleeve within each bearing, a tube within each sleeve and vulcanized thereto, said tube being longer than the bearing and having annular flanges on its ends adapted to bear against the inside aprons of the spaced angled plates, lugs on the ends of the tube engaging the inside aprons, and bolts passing through the inside aprons and threaded in the tube.

4. In a track for track-laying vehicles, a series of spaced shoes, each shoe consisting of a pair of identical angled plates spaced transversely of the track, each plate having a horizontal tread portion and a tapered, inclined, outer guide portion, each angled plate having end aprons and an inside apron, links for connecting the ends of each shoe with adjacent shoes, each link having bearings on opposite ends, a rubber sleeve within each bearing, a tube within each sleeve and vulcanized thereto, said tube being longer than the bearing and having annular flanges on its ends adapted to bear against the inside aprons of the spaced angled plates, means for holding the tube and plates against relative rotational movement, and bolts passing through the inside aprons and threaded in the tube.

5. In a track for track-laying vehicles, a series of spaced shoes each shoe consisting of a pair of identical tread plates spaced transversely of the track, each plate having end aprons and an inside apron, links for connecting the ends of each shoe with adjacent shoes, each link having bearings on opposite ends, a rubber sleeve within each bearing, a tube within each sleeve and vulcanized thereto, said tube being longer than the bearing and having annular flanges on its ends adapted to bear against the inside aprons of the spaced plates, lugs on the ends of the tube engaging the inside aprons, headed bolts passing through the inside aprons and threaded in the tube, the heads of the bolts bearing against the inside aprons.

6. In a track for track-laying vehicles, a series of spaced shoes each shoe consisting of a pair of identical tread plates spaced transversely of the track, each plate having end aprons and an inside apron, links for connecting the ends of each shoe with adjacent shoes, each link having bearings on opposite ends, a rubber sleeve within each bearing, a tube within each sleeve and vulcanized thereto, said tube being longer than the bearing and having annular flanges on its ends adapted to bear against the inside aprons of the spaced plates, means for holding the tube and plates against relative rotational movement, and bolts passing through the inside aprons and threaded in the tube.

7. In a track for track-laying vehicles, a series of spaced shoes, each shoe including a pair of identical plates spaced transversely of the track, the plates having aprons on their adjacent sides, links for connecting the ends of each shoe with adjacent shoes, each link having bearings on opposite ends, a rubber sleeve within each bearing, a tube within each sleeve and vulcanized thereto, said tube being longer than the bearing and having annular flanges on its ends adapted to bear against the aprons of the spaced plates, lugs on the ends of the tube engaging the aprons, and bolts passing through the aprons and threaded in the tube.

8. In a track for track-laying vehicles, a series of spaced shoes, each shoe including a pair of identical plates spaced transversely of the track, the plates having aprons on their adjacent sides, links for connecting the ends of each shoe with adjacent shoes, each link having bearings on opposite ends, a rubber sleeve within each bearing, a tube within each sleeve and vulcanized thereto, said tube being longer than the bearing and having annular flanges on its ends adapted to bear against the aprons of the spaced plates, means for holding the tube and plates against relative rotational movement, and bolts passing through the aprons and threaded in the tube.

9. In a track for track-laying vehicles, a series of spaced shoes, each shoe including a pair of identical plates spaced transversely of the track, the plates having aprons on their adjacent sides, links for connecting the ends of each shoe with adjacent shoes, each link having bearings on opposite ends, a rubber sleeve within each bearing, a tube within each sleeve and vulcanized thereto, means for holding the tube and plates against relative rotational movement, and bolts passing through the aprons and threaded in the tube.

10. In a track for track-laying vehicles, a series of spaced shoes, each shoe including a pair of identical tread plates spaced transversely of the track, each tread plate having a channel portion and having an apron on its inner side, a reinforcing plate for the apron having a flange fitting against the channeled tread plate, means for securing the reinforcing plate to the tread plate, links for connecting the ends of each shoe with adjacent shoes, and a pair of bolts passing through the reinforcing plate and apron of each tread plate and threadedly engaging the corresponding ends of adjacent links.

11. In a track for track-laying vehicles, a series of spaced shoes, each shoe including a pair of identical tread plates spaced transversely of the track, each tread plate having a channel portion and having an apron on its inner side, a reinforcing plate for the apron having a flange fitting against the channeled tread plate, means for securing the reinforcing plate to the tread plate, links for connecting the ends of each shoe with adjacent shoes, and a pair of link pins passing through the reinforcing plates and aprons and engaging the corresponding ends of adjacent links.

12. In a track for track-laying vehicles, a series of spaced shoes, each shoe including a pair of identical plates spaced transversely of the track, the plates having aprons on their adjacent sides, links for connecting the ends of each shoe with adjacent shoes, and a pair of bolts passing through the apron of each tread plate and threadedly engaging the corresponding ends of adjacent links.

13. In a track for track-laying vehicles, a series of spaced shoes, each shoe including a pair of identical plates spaced transversely of the track, links for connecting the ends of each shoe with adjacent shoes and spacing the plates of each shoe, and a pair of bolts passing through each plate and threadedly engaging the corresponding ends of adjacent links.

HARRY A. KNOX.
THOMAS HAY NIXON.